(12) United States Patent
Davies (10) Patent No.: US 9,819,285 B2
(45) Date of Patent: Nov. 14, 2017

(54) POWER CONVERSION SYSTEM (76) Inventor: Kevin Stephen Davies, Duncraig (AU)

( * ) Notice: Subject to any disclaimer, the term of this patent is extended or adjusted under 35 U.S.C. 154(b) by 320 days.

(21) Appl. No.: 14/238,712

(22) PCT Filed: Aug. 10, 2012

(86) PCT No.: PCT/AU2012/000964
§ 371 (c)(1),
(2), (4) Date: Feb. 12, 2014

(87) PCT Pub. No.: WO2013/023248
PCT Pub. Date: Feb. 21, 2013

(65) Prior Publication Data
US 2014/0254219 A1    Sep. 11, 2014

(30) Foreign Application Priority Data

Aug. 12, 2011 (AU) ................. 2011903228

(51) Int. Cl.
H02M 7/49   (2007.01)
H02M 1/00   (2006.01)
H02J 3/38   (2006.01)
H02J 7/00   (2006.01)

(52) U.S. Cl.
CPC .............. H02M 7/49 (2013.01); H02J 3/383 (2013.01); H02J 7/0065 (2013.01); H02M 2001/0077 (2013.01); Y02E 10/563 (2013.01)

(58) Field of Classification Search
CPC ............ H02M 2001/0077; H02M 7/49; H02J 7/0065; H02J 3/383
USPC .................................................. 363/67, 68
See application file for complete search history.

(56) References Cited

U.S. PATENT DOCUMENTS

| | | | | | |
|---|---|---|---|---|---|
| 4,052,657 | A | * | 10/1977 | Kleiner | H02M 7/49 363/43 |
| 4,894,764 | A | * | 1/1990 | Meyer | H02J 3/32 307/38 |
| 6,771,045 | B1 | * | 8/2004 | Keller | H01M 10/441 320/118 |
| 8,712,516 | B2 | * | 4/2014 | Cantatore | A61N 1/378 607/2 |
| 2011/0101915 | A1 | * | 5/2011 | Mitsutani | B60K 6/445 320/109 |

(Continued)

OTHER PUBLICATIONS

Handt Karsten, Network connection of solar cells, Jan. 14, 2010, WIPO, WO 2010003941 A2.*

Primary Examiner — Timothy J Dole
Assistant Examiner — Bart Iliya
(74) Attorney, Agent, or Firm — Tope-McKay & Associates (57) ABSTRACT A power conversion system comprising a plurality of modules each having an input and an output and being connected in series. Each module is connected to at least one DC power source that supplies power to the module. Voltage control circuitry provided within each of the modules to vary the voltage supplied between the input and the output between a maximum module voltage and a minimum module voltage. A control unit in communication with the voltage control circuitry of each of the modules varies the voltage supplied across the input and output of each of the modules such that the total voltage across the series connected modules forms an AC signal or a rectified version of an AC signal.

45 Claims, 3 Drawing Sheets (56) References Cited

U.S. PATENT DOCUMENTS

2012/0134186 A1* 5/2012 Johnson .................. H02J 3/385
                                                          363/71
2013/0009700 A1* 1/2013 Deboy .................... H02J 3/383
                                                          327/581

* cited by examiner

POWER CONVERSION SYSTEM

BACKGROUND OF THE INVENTION (1) Field of Invention

The present invention relates to a power conversion system for DC/AC power conversion, and more particularly to such a system comprising a plurality of modules where the voltage supplied across the input and output of each of the modules is such that the total voltage across the series connected modules forms an AC signal or a rectified version of an AC signal.

(2) Description of Related Art

There are a number of applications in which conversion is required between DC power and AC power.

Solar power generation is one such example. Generation of power from solar panels cur comprises wiring a number of solar panels together to supply DC power to an inverter. The solar panels are generally connected in series such that the DC voltage generated is higher than the required AC voltage and an inverter converts this DC voltage into AC power at the required mains voltage. Similar arrangements may be used to convert power from batteries to AC power.

A continuing need exists for a system for converting power between a plurality of DC power sources and AC power providing a number of advantages including the ability to provide greater efficiency and flexibility.

SUMMARY OF THE. INVENTION

The present invention relates to a power conversion system for DC/AC power conversion, and more particularly to such a system comprising a plurality of modules where the voltage supplied across the input and output of each of the modules is such that the total voltage across the series connected modules forms air AC signal or a rectified version of an AC signal.

In a first aspect, the invention relates to a power conversion system with a plurality of modules each having an input and an output and being connected in series such that the output of any module is connected to the input of a subsequent module, with each module being connected to at least one DC power source that supplies power to the module. Voltage control circuitry is provided within each of the modules to vary the voltage supplied between the input and the output between a maximum module voltage and a minimum module voltage. A control unit is in communication with the voltage control circuitry of each of the modules. The control unit varies the voltage supplied across the input and output of each of the modules such that the total voltage across the series connected modules forms an AC signal or a rectified version of an AC signal.

In another aspect, the control unit is in communication with a mains supply to receive information regarding the phase of the mains signal and the control unit controls the modules such that the AC signal or rectified AC signal is in phase with the mains supply.

In yet another aspect, each of the modules includes one or more storage devices in connection with the power source such that the power source charges the storage devices when the module is not supplying power to the system.

In still another aspect, the minimum module voltage is the reverse polarity of the maximum module voltage and the control unit varies the voltages supplied by the modules to form an AC signal.

In a still further aspect, the voltage control circuitry comprises switching devices connected such that the switching devices are operable to connect the storage devices between the input and the output in a first direction to provide the maximum module voltage, in a second opposite direction to provide the minimum module voltage and operable to bypass the storage devices.

In a yet further aspect, the minimum module voltage is the voltage across the module when the storage devices are bypassed and the control unit varies the voltages supplied by the modules to form a rectified AC signal.

In another aspect, the voltage control circuitry comprises switching devices connected such that the switching devices are operable to connect the storage devices between the input and the output in a first direction to provide the maximum module voltage and operable to bypass the storage devices to provide zero voltage between the input and output.

In still another aspect, the control unit includes circuitry to reverse the voltage from the series connected modules every half cycle so that the resulting voltage forms an AC signal.

In a further aspect, a switching regulator is provided in one or more modules connected to the storage device to control the voltage provided by the storage device across the input and output such that the voltage applied is ramped up or down to more closely approximate the mains signal.

In yet another aspect, the switching regulator comprises switching devices provided to create a pulse width modulated signal from the storage device voltage provided to a filter wherein the on to off time is increased to ramp up the output signal or decreased to ramp down the output signal.

In another aspect, when the voltage applied across the input and output is near the maximum voltage for the module, the switching regulator is bypassed.

In a still further aspect, when the voltage applied across the input and output is near zero voltage, the switching regulator is bypassed.

In a yet further aspect, one or more modules include first and second storage devices connected in series wherein the power source is switched alternately across the first and second storage devices such that the module provides a voltage doubling function.

In another aspect, one or more further modules be provided having storage devices charged to voltages below the power source voltage to provide a voltage smoothing function.

In yet another aspect, the storage device of each further module is charged to a lower level than a previous further module.

In a still further aspect, one of the modules comprises a first line and a second line connected in parallel between an input and an output; and first and second switching devices in the first line and third and fourth switching devices in the second line; the power source and storage device being connected across the first and second lines between the first and second switching devices and the third and fourth switching devices. Switching on the first and fourth switching devices and switching off the second and third switching devices results in the storage device being connected across the input and output in a first polarity, switching off the first and fourth switching devices and switching on the second and third switching devices results in the storage device being connected across the input and output in a second opposite polarity and switching on the first and second switching devices and switching off the third and fourth switching devices results in a direct connection between the input and the output.

In another aspect, the switching devices each comprise MOSFETS.

In yet another aspect, a regulator device is provided between one or more of the power sources and the associated storage devices such that each regulator device is provided to match the voltage of the power source to the voltage in the storage devices.

In a still limber aspect, the power sources comprise devices into which energy can be stored and the system is configured to detect the charge levels in the power sources and to redistribute the charge to balance the charge levels between power sources.

In another aspect, the charge levels are balanced by switching modules with excess charge in a forward direction and switching modules with a deficient charge level in a reverse direction.

In still another aspect, the system is shielded by an enclosure to reduce EMI and common filtering is provided at output terminals of the enclosure.

In yet another aspect, the invention is a method for providing and/or operating the devices and features set forth above in a set of acts to provide DC/AC conversion.

BRIEF DESCRIPTION OF THE DRAWINGS

The objects, features and advantages of the present invention will be apparent from the following detailed descriptions of the various aspects of the invention in conjunction with reference to the following drawings, where.

1 is a circuit diagram of a power conversion system in accordance with the present invention.

DETAILED DESCRIPTION

The present invention relates to a power conversion system for DC/AC power conversion, and more particularly to such a system comprising a plurality of modules where the voltage supplied across the input and output of each of the modules is such that the total voltage across the series connected modules forms an AC signal or a rectified version of an AC signal. The following description is presented to enable one of ordinary skill in the art to make and use the invention and to incorporate it in the context of particular applications. Various modifications, as well as a variety of uses, in different applications ill be readily apparent to those skilled in the in and the general principles defined herein may be applied to a wide range of embodiments. Thus, the present invention is not intended, to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of ill such papers and documents are incorporated herein by reference. AU the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing as specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counterclockwise have been used for convenience purposes only and are not intended, to imply any particular fixed direction. Instead, they are used to reflect relative locations and/or directions between various portions of an object. As such, as the present invention is changed, the above labels may change their orientation.

Figure 1:
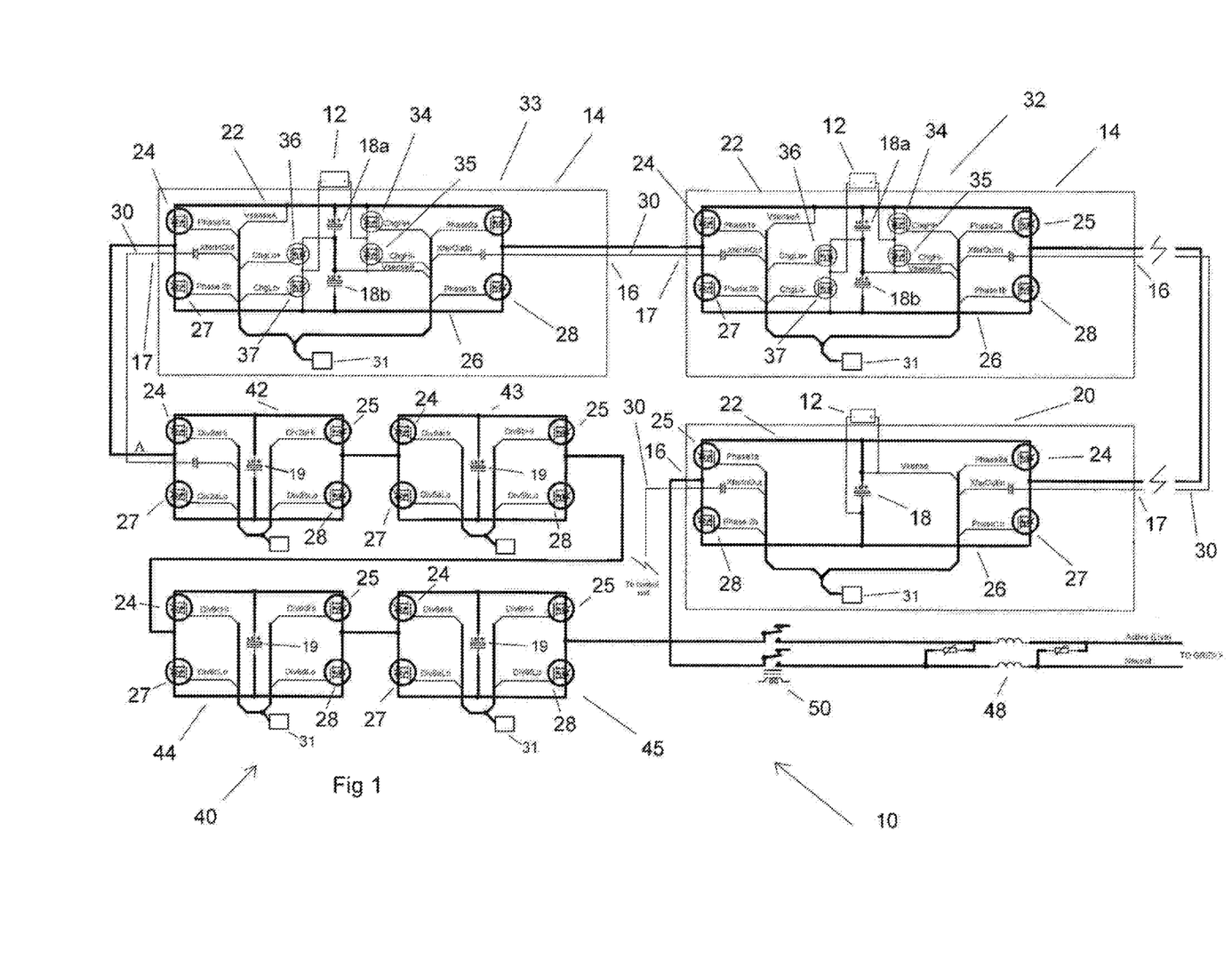
Figure 2:
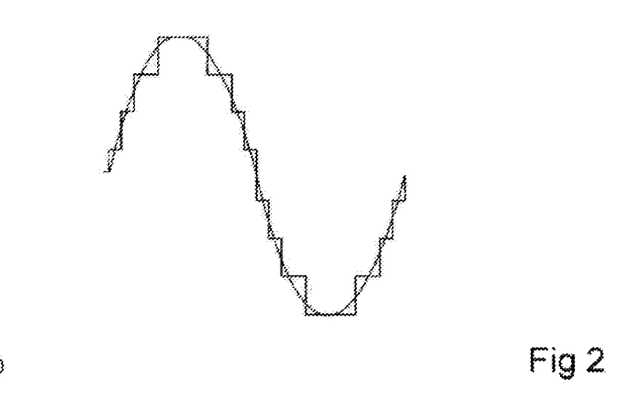
FIG. 2 is a graph showing stepwise output from the system of FIG. 1.

Referring now to FIGS. 1 and 2, there is shown a first embodiment of a power conversion system 10 in accordance with the present invention. The power conversion system 10 is provided for converting DC power front a plurality of power sources 12 to AC power of the type suitable for feeding to a power grid.

The power conversion system 10 includes a plurality of modules 14 each associated with at least one of the power sources. The power sources 12 may be, for example, solar panels or batteries. Each of the modules 14 is provided with an input 16 and an output 17, DC voltage generated by the power sources 12 is to be provided, across the input 16 and the output 17 and the modules 14 are to be connected in series such that the output 17 of each module. 14 is connected to the input 16 of a subsequent module 14. The power conversion system 10 therefore includes a system input and a system output providing the series voltage across each of the modules 14. That is, the sum of the voltages provided, across the inputs 16 and outputs 17 of all of the modules 14.

Each of the modules 14 is provided with voltage control circuitry to vary the voltage supplied across the input 16 and output 17 of the module 14. The module voltage provided across the input and output may be varied between a maximum module voltage and a minimum module voltage by the voltage control circuitry. In the embodiment shown, the voltage control circuitry includes a plurality of switching devices. In the embodiment shown, the switching devices each comprise a MOSFET. The switching devices are connected such the power source 12 can be switched to either provide a voltage between the input and output in a first polarity, provide a voltage between the input and output in a second polarity or bypassed. Therefore in this embodiment the maximum module voltage is the power source voltage and the minimum module voltage is the reverse polarity power source voltage.

Each of the modules 14 is also provided with a storage device 18 connected to the terminals of the power source 12. The storage devices 18 in the embodiment shown comprise electrolytic capacitors, however other devices such as polymer capacitors or rechargeable batteries may be used. The storage devices 18 store charge from the power source 12 such that when the module 14 is bypassed, power generated by the power source 12 continues to be stored in the storage device 18 for use. The storage devices 18 may be remote from or part of the power source 12.

The modules 14 are provided in a number of configurations. A first module 20 is provided such that the first module 20 provides power from the connected power source 12 and storage device 18 in first or second polarities across the input and output 16 and 17 or bypasses the power source 12 and storage module 18 such that the input 16 is connected directly to the output 17. The maximum module voltage in this case is around the power source voltage and the minimum module voltage is around the negative of the power source voltage.

The first module 20 comprises a first line 22 and a second line 26 connected in parallel between the input 16 and the output 17. The first line 22 is provided with first and second switching devices 24 and 25 and the second line 26 is provided with third and fourth switching devices 27 and 28. The power source 12 and storage device 18 are connected across the first and second lines 22 and 26 between the first and second switching devices 24 and 25 and the third and fourth switching devices 27 and 28.

The power conversion system 10 is provided with a control unit (not shown in FIG. 1 to control operation of the switching devices. The control unit is connected to a control line 30 that communicates information to each of the modules 14 that are connected in series and causes the switching devices to be individually switched either on or off. Each of the modules is provided with a local controller 31 that receives the information from the control unit. The local controllers of this embodiment provide supervisory functions, locally control the switching devices and pass information about the state of the module 14 hack to the main control unit. While the embodiment shown utilises a cable connection to pass control information between the control unit and each of the modules 14, other methods may be employed. For example wireless communication methods may be used to relay information to and/or from the control unit.

In the first module 20, it can be seen that by switching on the first and fourth switching devices 24 and 28, and switching off the second and third switching devices 25 and 27, the storage device 18 is connected across the input 16 and output 17 in a first polarity. By switching off the first and fourth switching devices 24 and 28 and switching on the second and third switching devices 25 and 27, the storage device 18 is connected across the input 16 and output 17 in a second opposite polarity. By switching off the first and second switching devices 24 and 25 and switching on the third and fourth switching devices 27 and 28, a direct connection is made between the input 16 and the output 17 and the storage device 18 and the power source 12 are bypassed. In the bypassed state, the energy generated by the power source 12 is stored in the storage device 18.

The main control unit switches each of the modules 14 such that the resulting output voltage of the system 10, being the sum of the voltages across the modules 14 comprises an AC signal. The control unit is in communication with the mains supply to receive information regarding the phase voltage and current of the mains signal and controls the modules such that the AC signal voltage created is in phase with the mains supply and the current is controlled to suitable for supply to the mains system.

That is, in general, as the mains signal voltage increases in the positive portion of its cycle, the control unit sequentially switches modules 14 from the bypass configuration to the configuration in which the storage device 18 is connected in the first (positive) polarity to raise the system output voltage to follow the mains signal. As the mains voltage falls in the positive portion of the cycle, the control unit starts switching modules 14 to the bypass mode to lower the total voltage and follow the mains signal. The same occurs during the negative portion of the mains cycle with the modules 14 being switched such that the voltage is supplied in the second (negative) polarity to follow the mains signal. As can be seen in FIG. 2, the resulting AC signal created comprises a stepwise approximation of a sine wave.

The modules 14 may be arranged to provide voltage levels added to the Output of the system 10 that are either multiples or fractions of the voltage generated by the power sources 12 in order to allow closer approximation of the mains signal, in the embodiment shown, there are provided second and third modules 32 and 33 that provide a voltage doubling function. The arrangement of the switching devices in the second and third modules 32 and 33 is the same as that in the first module 20. The second and third modules 32 and 33 however are provided with first and second storage devices 18a and 18b connected in series across the first and second lines 22 and 26. Also provided are first, second, third and fourth secondary switching devices 34, 36 and 37.

The first secondary switching device 34 is connected between a first terminal of the power source 12 and a first side of the first storage device 18a. The second secondary switching device 35 is connected between the first terminal of the power source 12 and the second side of the first storage device 18a (being the first side of the second storage device 18b). The third secondary switching device 36 is connected from a second terminal of the power source 12 to the second side of the first storage device 18a. The fourth secondary switching device 37 is connected between a second terminal of the power source 12 and the second side of the second storage device 18b.

By switching on the first and third secondary switching devices 34 and 36 and turning off the second and fourth secondary switching devices 35 and 37, the power source 12 can be connected across the first storage device 18a. By switching off the first and third secondary switching devices 34 and 36 and turning on the second and fourth secondary switching devices 35 and 37, the power source 12 can be connected across the second storage device 18b. By alternately charging the first, and second storage devices 18a and 18b, the total voltage across the storage devices 18a and 18b can be brought up to around twice the voltage of the power source 12. The second and third modules 32 and 33 can therefore be switched in when larger steps in the total voltage are required to approximate the sinusoidal mains voltage. Alternatively, the first module 20 may be switched in the opposite polarity at the same time as either voltage doubler module 32 or 33 is switched in circuit if a smaller step is required. When modules are switched in opposite polarity, the storage device 18 of the reverse switched panel module is charged. The second and third modules 32 and 33 therefore act as voltage doublers which has the added advantage of reducing the number of power sources required.

The power conversion system 10 is also provided with further modules provided to switch voltage to more accurately approximate the sine wave signal. As it is desirable to reduce EMC by not switching the power sources on and off too quickly, higher frequency switching is performed by these further modules separate of the power sources. It is desirable to not inject high frequencies into the grid power and this process ensures capacitance between a power source and an earthed metal roof does not cause these unwanted signals to be conducted back down the grid power lines.

In the embodiment shown, there are four such further modules 40. Each of the further modules 40 is of a similar configuration to the first module 20 in that it includes first, second, third and fourth switching devices and a storage device 19 connected in the same manner. The main control unit controls the state of charge and therefore the voltage of storage devices 19 of the further modules 40 by choosing the polarity they are switched into circuit. They are discharged when switched in circuit the same way around as the modules and charged when switched into the opposite polarity. They are charged to provide differing voltages in each further module 40. In the embodiment shown, the first further module 42 is configured such that the storage device 19 provides a voltage of approximately that of a power source 12. The first further module 42 can therefore be switched in the opposite polarity to one of the second or third modules 32 or 33 if only a single level of increased voltage is required. The first further module 42 therefore acts as a corrector for the voltage doubler modules 32 and 33 and this results in the storage device 19 of the first further module 42 being charged. If the charge in the storage device 19 of the first further module 42 is sufficiently high, the first further module 42 can simply be switched on to provide the single level of voltage increase.

The second, third and fourth further modules 43, 44 and 45 are each of the same configuration and the storage devices 19 are charged to reducing voltage levels by the same process described above. In the embodiment shown, the storage device 19 of the second further module 43 is charged to around half of the power source voltage. The storage device 19 of the third further module 44 is charged to a voltage around half of that of the second further module 43 and the storage device 19 of the fourth further module 45 is charged to a voltage around half of that of the third further module 44. The second, third and fourth further modules 43, 44 and 45 can therefore be switched to provide smaller steps in voltage and act as voltage smoothers.

The switching of the modules 14 takes place providing a high resolution stepwise AC signal similar to that shown in FIG. 2. The system 10 may be provided, with main power inductors 48 connected in series with the modules 14 to smooth the switched voltage.

Further smoothing may be achieved by switching the further modules to form a PWM signal into the inductors. A main relay 50 is provided to switch power from the system 10 to the main grid line.

High voltage capacitors are provided in series with the control lines to ensure safety and stop corrosion on these lines from anodic or cathodic conduction. Information passed along the control lines 30 could be delayed as it transfers through each module 14 but if so then the delay will be known or determinable so each module knows at what time to switch. This is important in situations where for instance power source is to be turned on and another turned off. As the delay is known both switch synchronously thus reducing ripple and EMC spikes from the system.

Information could be transmitted in both directions, to and from the control unit, and include control information such as when modules should switch and in what way they should switch. The step voltage could also be measured at the terminals marked A and B in the drawings. Communication is momentarily delayed during switching and in this way reliable communications continues across the switching event.

The present system operates at lower voltages than traditional inverters. Generally such inverters operate at the series wired voltage of all power sources. In the present system, the MOSFETS operate at around 50 volts and can therefore have to much lower on resistance than high voltage MOSFETS and do not have the wasted power of IGBTs. This can improve the overall efficiency of the present system relative to known systems. Also, the lower voltage can result in improved reliability. When relay 50 is switched off and each module is commanded to bypass, the system electrically shuts down and is safe for maintenance work to be performed.

The main inductors 48 smooth the resulting step or PWM voltages (around ⅛th of the power source voltage) resulting in low system losses per cycle. The low voltage step permitting the inductor to be much smaller than for conventional inverters.

In a further embodiment each of the modules 14 is provided with a switching regulator 60. The switching regulator 60 is provided connected to the storage device 18. The switching regulator 60 controls the voltage provided by the storage device 18 across the input 16 and output 17. In particular, the switching device controls the rate of change of voltage across the input 16 and output 17. The switching regulator 60 allows the voltage applied by the storage device 18 to be ramped up or down to more closely approximate the sinusoidal mains signal, rather than the stepwise approximation of the embodiment shown in FIG. 1. The switching regulator 60 is controlled by the control unit, which senses the mains voltage such that the voltage applied by the storage device 18 can be appropriately regulated, removing the need for the further modules 42 to 45.

When the required output voltage of the module is near the maximum or minimum levels, the switching regulator may be bypassed. This bypassing of the switching regulator 60 when not required will eliminate the losses inside the switching regulator during the period it is not required.

Figure 3:
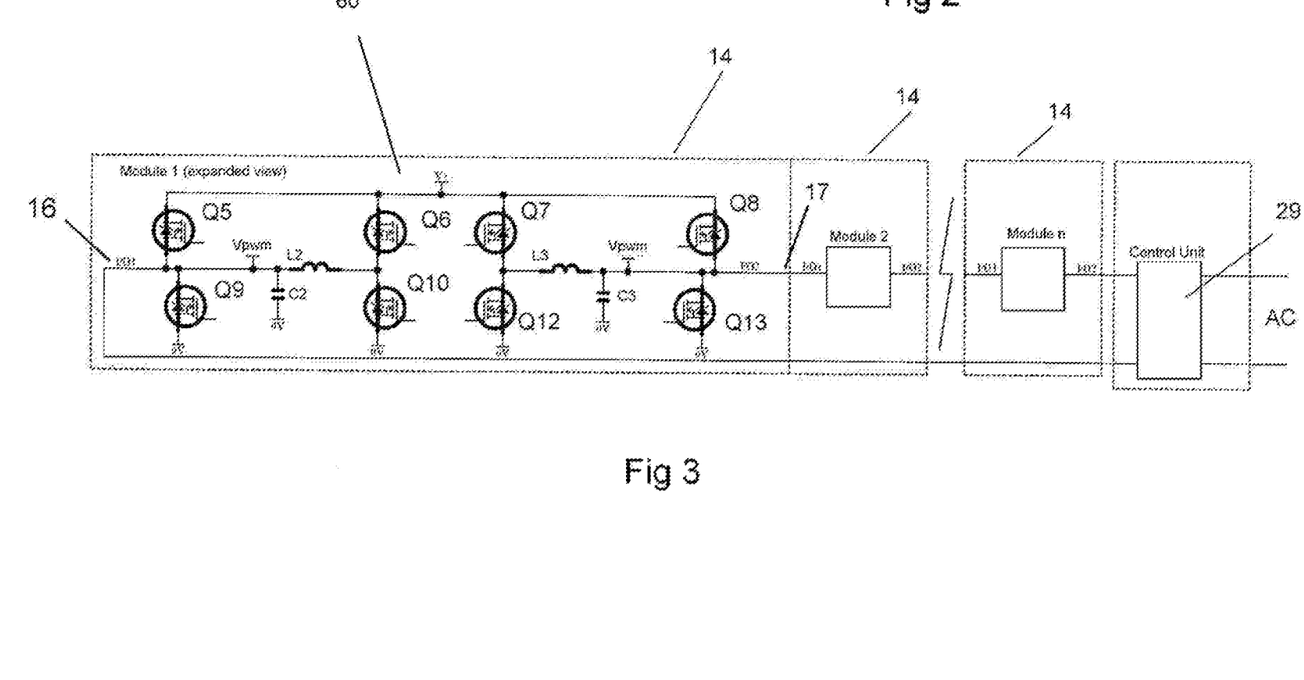
FIG. 3 is a circuit diagram of an alternative embodiment of circuitry provided within a module.

FIG. 3 shows a circuit diagram of circuitry of a module 14 of this type. The power sources 12 and the storage devices 18 are not shown in this diagram for clarity. The voltage from the storage devices 18 is provided to the circuit at V+ from the storage devices 18 as previously shown in FIG. 1.

The switching regulator 60 function is provided by a first pair of regulator switching devices Q7 and Q12 and a second pair of regulator switching devices Q6 and Q10. First, second, third and fourth switching devices Q8, Q5, Q13 and Q9 are used to control the voltage applied across the input and output in a similar manner to the first embodiment. All of the switching devices are controlled by the control unit 29.

When it is required to ramp up the voltage during the positive portion of the AC cycle, Q7 is first switched on for a period required to charge the inductor L1 to have similar current as that flowing from terminal I/O1 to I/O2 and then Q13 is switched off. The first pair of regulator switching devices Q7 and Q12 are then used to create a pulse width modulated signal applied to a filter comprising inductor L3 and capacitor C3. Q7 and Q12 are alternatively switched on and the percentage of time that Q7 is on relative to Q12 is increased. The voltage at Vpwm on the output 17 side increases smoothly and in proportion to the PWM by virtue of the inductor L3 and capacitor C3. The slew rate is preferably controllable according to measured current through the module or slew rate commands received from the main control unit. During this time, switching devices Q9 and Q10 are on to bypass the input side of the circuit.

Once full voltage is reached, switching device Q8 is turned on to provide the full voltage across the input 16 and output 17.

When it is required to ramp down the voltage, Q8 is turned off in a controlled way to enable the current through inductor L3 to again match the current flowing from terminal I/O1 to I/O2 and then the reverse ramping process occurs. That is, the tune Q7 is on relative to Q12 is decreased to zero to ramp down the voltage. Switching device Q13 is then turned on to bypass the output side of the circuit.

During the negative portion of the cycle, the same process as above is performed but with the second pair of regulator switching devices Q6 and Q10 being switched to control the voltage created at Vpwm on the input 16 side while switching device Q9 is turned off.

Two or more modules may provide PWM ramping at the same time with the control unit using an overlap of PWM to provide a smooth transition of ramping from one module to another. The system can in this case operate without first, second, third and fourth switching devices Q8, Q5, Q13 and Q9.

Figure 4:
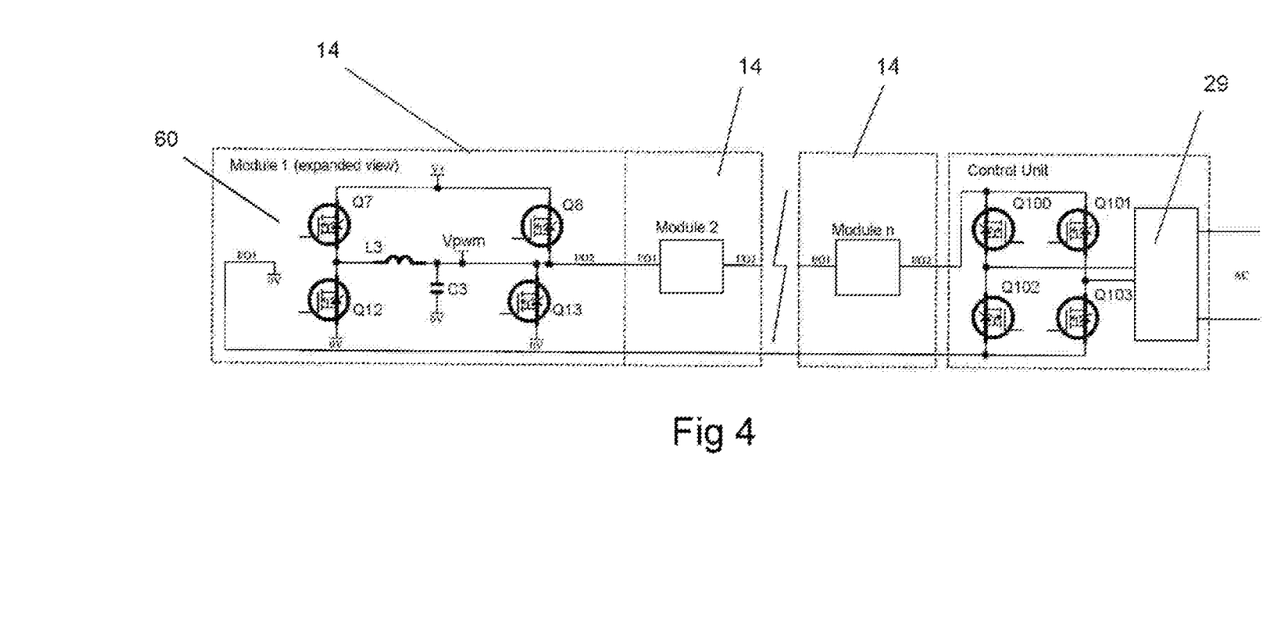
FIG. 4 is a circuit diagram of a further alternative embodiment of the module.

FIG. 4 shows a further alternative embodiment of the arrangement of the panel module 14. The circuit of FIG. 4 is similar to that of FIG. 3 however only one side is provided to create only to unidirectional waveform. The series connected modules therefore create a rectified version of an AC signal. Switching devices Q100, Q101, Q102 and Q103 in the control unit are then provided to convert to the full waveform by switching on Q100 and Q103 during one half cycle and switching on Q101 and Q102 during the alternate half cycle.

The control unit may be configurable by a device having a user interface. The control unit may be configurable such that the system produces an output of a configured voltage level and frequency. The system will then produce this voltage level and frequency as long as there are sufficient modules to operate reliably and while the detected mains signal is within an acceptable range of the configured voltage and frequency. Alternatively, if the system is not connected to a mains supply and used to supply standalone power, the system will simply provide the configured voltage and frequency. The control unit may therefore be configured by the user interface to provide power for a range of systems such as 110V, 240V and 415V systems.

Also, one or more modules could operate with a single polarity only. In this arrangement, the control means either controls back to back modules to provide the required reverse polarity or incorporates a switching means that converts unidirectional voltages received from modules to an AC signal for driving the mains terminals.

Also the control means may incorporate a switching regulator in place of some or all of the smoothing modules, the switching regulator being used to compensate for the stepwise voltages received from the modules and being smoothed by a common filter capacitor placed across the mains terminals. This switching regulator may be incorporated into one of the modules drawing power from its storage capacitor.

Also a regulator device (not shown) may be provided between the power sources 12 and the associated storage devices 18. The regulator devices may be switching regulators provided to match the voltages of the power sources to the voltages in the storage devices.

Where energy can be stored back into a power source, such as a battery, it is preferable for the system to be configured to detect the levels of charge in the power sources and to redistribute the charge to balance the charge levels between power sources. The main controller may balance the levels by switching modules with excess charge in circuit in a forward direction while switching modules with a deficient charge level in a reverse direction so the current flowing in the system redistributes the charge to balance the charge levels.

It may be desirable to shield the power control system to avoid producing unacceptable electro-magnetic interference (EMI). Such shielding may be incorporated in systems with batteries as the power sources may have high switching frequencies and currents outside of a module, for instance where a common filter capacitor is used.

For uninterruptable power supply (UPS) applications it may be preferable to draw the main switching power directly from the low impedance battery power sources. The power source 12 doubles as the storage device 18 with charge recovery taking place when the module is not supplying power to the system. A capacitor may be used across the lines 22 and 26 for the prevention of unwanted EMI and unwanted switching currents in the power sources. Where a storage device is used, an inductor may be placed between the power source 12 and module 14 for the same purpose.

The power conversion system may incorporate a control routine that provides a power conditioning function to improve the AC wave shape. Preferably the control routine takes account of instantaneous currents and/or harmonic currents and/or harmonic voltages and alters the system output so that the resulting wave shape at the system output or a location remote from the output to which the signal is delivered more closely resembles a sine wave.

Power for traction control could be provided by configuring the system in two strings (delta configuration) or three strings (star configuration) to provide three phase power to a traction motor. System output voltage and frequency would be controllable. Inductors could be provided between the power sources and storage devices with modules being switched sequentially so the inductors smooth the current in the batteries. In a closed system such as this, no output smoothing capacitor is required, however capacitors could still be used to reduce EMI.

It will be readily apparent to persons skilled in the relevant arts that various modifications and improvements may be made to the foregoing embodiments, in addition to those already described, without departing from the basic inventive concepts of the present invention.

One skilled in the art would realise that any number of modules may be used rather than just the three shown in FIG. 1. Also, bypassing the power sources as described in relation to the embodiment of FIG. 3 is not required for suitable operation. For example, all series modules could provide PWM ramping at the same time thus brining an AC sine waveform across terminals 16 and 17 of each module. The control unit 29 would provide synchronizing, voltage and/or control information to the modules so that the series connected modules provide AC power that can be fed to a power grid.

What is claimed is:

1. A power conversion system comprising:
a plurality of modules each having an input, an output and a storage device and being connected in series, one or more of the modules being connected to at least one DC power source that supplies power to the storage device within the module;
voltage control circuitry provided within each of the modules to vary the voltage supplied between the input and the output by the storage device between a maximum module voltage and a minimum module voltage; and a control unit in communication with the voltage control circuitry of each of the modules such that the control unit varies the voltage supplied across the input and output of each of the modules such that the total voltage across the series connected modules would form a stepwise approximation of an AC signal or a rectified version of an AC signal;

wherein at least one of the modules comprises a voltage smoothing function by controlling the voltage provided by the storage device to apply a voltage between the input and the output of the module between said maximum and minimum module voltages such that the total voltage across the series connected modules more closely approximates the AC signal.

2. A power conversion system in accordance with claim 1, wherein the control unit is in communication with a mains supply to receive information regarding the phase of the mains signal and the control unit controls the modules such that the AC signal or rectified AC signal is in phase with the mains supply.

3. A power conversion system in accordance with claim 2, wherein the control unit controls the modules such that the system output voltage follows the mains signal.

4. A power conversion system in accordance with claim 1, wherein the minimum module voltage is the reverse polarity of the maximum module voltage and the control unit varies the voltages supplied by the modules to form the AC signal.

5. A power conversion system in accordance with claim 4, wherein the voltage control circuitry comprises switching devices connected such that the switching devices are operable to connect the storage devices between the input and output in a first direction to provide the maximum module voltage, in a second opposite direction to provide the minimum module voltage and operable to bypass the storage devices.

6. A power conversion system in accordance with claim 5, wherein one of the modules comprises:
- a first line and a second line connected in parallel between an input and an output; and
- first and second switching devices in the first line and third and fourth switching devices in the second line, the storage device being connected across the first and second lines;
- wherein switching on the first and fourth switching devices and switching off the second and third switching devices results in the storage device being connected across the input and output in a first polarity, switching off the first and fourth switching devices and switching on the second and third switching devices results in the storage device being connected across the input and output in a second opposite polarity and switching on the first and second switching devices and switching off the third and fourth switching devices results in a direct connection between the input and the output.

7. A power conversion system in accordance with claim 6, wherein the switching devices comprise MOSFETS.

8. A power conversion system in accordance with claim 1, wherein the minimum module voltage is the voltage across the module when the storage devices are bypassed and the control unit varies the voltages supplied by the modules to form a rectified AC signal.

9. A power conversion system in accordance with claim 8, wherein the voltage control circuitry comprises switching devices connected such that the switching devices are operable to connect the storage devices between the input and the output in a first direction to provide the maximum module voltage and operable to bypass the storage devices to provide zero voltage between the input and output.

10. A power conversion system in accordance with claim 9, wherein the control unit includes circuitry to reverse the voltage from the series connected modules every half cycle so that the resulting voltage forms the AC signal.

11. A power conversion system in accordance with claim 1, wherein one or more modules includes first and second storage devices connected in series wherein the power source is switched alternately across the first and second storage devices such that the module provides a voltage doubling function.

12. A power conversion system in accordance with claim 1, wherein a regulator device is provided between one or more of the power sources and the associated storage devices such that the regulator device is provided to match the voltage of the power source to the voltage in the storage devices.

13. A power conversion system in accordance with claim 1, wherein the power sources comprise a battery into which energy can be stored and the system is configured to detect the charge levels in the power sources and to redistribute the charge to balance the charge levels between power sources.

14. A power conversion system in accordance with claim 1, wherein the at least one DC power source comprises batteries, and the system is configured to detect the charge levels and the charge levels are balanced by switching modules with excess charge in a forward direction and switching modules with a deficient charge level in a reverse direction.

15. A power conversion system in accordance with claim 14, wherein the system includes common filtering and is shielded by an enclosure to reduce EMI from switching of the modules and associated power sources.

16. A power conversion system in accordance with claim 1, wherein the voltage smoothing function is provided by one or more further modules, the main control unit controlling the state of charge and therefore the voltage of the storage devices of the further modules by choosing the polarity they are switched into, the circuit and the storage device of each further module being charged to lower voltage level than a previous further module.

17. A power conversion system in accordance with claim 16, wherein the storage device of each further module is charged to around half of the voltage of the previous further module and the further modules being switched to provide smaller steps in voltage.

18. A power conversion system in accordance with claim 1, wherein the voltage smoothing function is provided by a switching regulator provided in one or more of the modules, the switching regulator being connected to the storage device to control the voltage provided by the storage device across the input and output of said module such that the voltage applied is ramped up or down to more closely approximate the AC signal.

19. A power conversion system in accordance with claim 18, wherein the switching regulator comprises switching devices provided to create a pulse width modulated signal from the storage device voltage provided to a filter wherein the on to off time is increased to ramp up the output signal or decreased to ramp down the output signal.

20. A power conversion system in accordance with claim 19, wherein once full voltage is reached, a bypass switching device associated with the switching regulator is turned on to provide the full voltage across the input and the output.

21. A power conversion system in accordance with claim 1, wherein the control unit is connected to a control line that communicates information to the modules and wherein each of the modules is provided with a local controller that receives the information from the control unit and provides supervisory functions, provides local control of the switching devices and passes information about the state of the modules back to the main control unit.

22. A power conversion system in accordance with claim 21, wherein information transferred from the control unit to the modules is delayed and the delay is known or determinable such that when one module is turned on and another turned off, both switch synchronously thus reducing ripple and improving the EMC of spikes from the system.

23. A method of converting power comprising:
providing a plurality of modules each having an input, an output and a storage device and being connected in series, one or more of the modules being connected to at least one power source that supplies power to the storage device within the module; and
controlling the voltage applied by the storage device across the input and output of each of the modules from a central control unit such that said voltage is varied between a maximum module voltage and a minimum module voltage such that the total voltage across the series connected modules would form a stepwise approximation of an AC signal or a rectified version of an AC signal; and
providing a smoothing function in at least one of the modules such that the voltage provided by the storage device between the input and output of said module is controlled to be between the minimum and maximum module voltages such that the total voltage across the series connected modules more closely approximates the AC signal.

24. A method in accordance with claim 23, wherein the control unit is in communication with a mains supply to receive information regarding the phase of the mains signal and controls the modules such that the AC signal or rectified AC signal is in phase with the mains supply.

25. A method in accordance with claim 24, wherein the control unit controls the modules such that the system output voltage follows the mains signal.

26. A method in accordance with claim 23, wherein each power source is connected to at least one storage device in the module and the power source charges the storage devices when the module is not supplying power to the system.

27. A method in accordance with claim 26, wherein the minimum module voltage is the reverse polarity of the maximum module voltage and the control unit varies the voltages supplied by the modules to form the AC signal.

28. A method in accordance with claim 27, wherein the voltage control circuitry comprises switching devices and the control unit operates the switching devices to connect the storage devices between the input and the output in a first direction to provide the maximum module voltage, in a second opposite direction to provide the minimum module voltage and bypasses the storage devices to provide zero voltage between the input and output.

29. A method in accordance with claim 23, wherein the minimum module voltage is the voltage across the module when the storage devices are bypassed and the control unit varies the voltages supplied by the modules to form a rectified AC signal.

30. A method in accordance with claim 29, wherein the voltage control circuitry comprises switching devices and the control unit operates the switching devices to connect the storage devices between the input and the output in a first direction to provide the maximum module voltage and bypasses the storage devices to provide zero voltage between the input and output.

31. A method in accordance with claim 30, wherein the control unit reverses the voltage from the series connected modules every half cycle so that the resulting voltage forms the AC signal.

32. A method in accordance with claim 23, wherein a regulator device provided between one or more of the power sources and the associated storage devices matches the voltage of the power source to the voltage in the storage devices.

33. A method in accordance with claim 23, wherein the power source comprises devices into which energy can be stored and the system detects the charge levels in the power sources and redistributes the charge to balance the charge levels between power sources.

34. A method in accordance with claim 23, wherein the power sources comprise devices into which energy can be stored, the system detects the charge levels in the power sources and the charge levels are balanced by switching modules with excess charge in a forward direction and switching modules with a deficient charge level in a reverse direction.

35. A method in accordance with claim 34, further comprising the steps of common filtering and shielding the system with an enclosure to reduce EMI from switching of the modules and associated power sources.

36. A method in accordance with claim 23, wherein the voltage smoothing function is provided by one or more further modules, the main control unit controlling the state of charge and therefore the voltage of the storage devices of the further modules by choosing the polarity they are switched into the circuit and the storage device of each further module being charged to a lower voltage level than a previous further module.

37. A method in accordance with claim 36, wherein the storage device of each further module is charged to around half of the voltage of the previous further module wherein the further modules are switched to provide smaller steps in voltage.

38. A method in accordance with claim 37, wherein the voltage smoothing function is provided by a switching regulator provided in one or more of the modules connected to the storage device, the switching regulator controlling the voltage provided by the storage device across the input and output of said module such that the voltage applied is ramped up or down to more closely approximate the AC signal.

39. A method in accordance with claim 38, including the step of the switching regulator creating a pulse width modulated signal from the storage device to be provided to a filter wherein the on to off time is increased to ramp up the output signal or decreased to ramp down the output signal.

40. A method in accordance with claim 39, wherein once full voltage is reached a further switching device is turned on to provide the full voltage across the input and output.

41. A power conversion system comprising:
a plurality of modules each having an input, an output and a storage device and being connected in series, one or more of the modules being connected to at least one DC power source that supplies power to the storage device within the module;

voltage control circuitry provided within each of the modules to vary the voltage supplied between the input and the output by the storage device between a maximum module voltage and a minimum module voltage; and a control unit in communication with the voltage control circuitry of each of the modules such that the control unit varies the voltage supplied across the input and output of each of the modules such that the total voltage across the series connected modules form an AC signal or a rectified version of an AC signal;

wherein the power sources comprise devices into which energy can be stored and the system is configured to detect charge levels in the power sources and to control the charge levels, wherein the charge levels are controlled by switching the modules into series in one direction to reduce excess charge and in an opposite direction to increase deficient charge levels.

42. A power conversion system in accordance with claim 41, wherein the power sources comprise a battery into which the energy is stored and the system is configured to detect the charge levels in the power sources and to balance the charge levels between modules having excess charge and modules having deficient charge.

43. A power conversion system in accordance with claim 42, wherein all series modules provide PWM ramping at the same time and the control unit provides synchronizing control information to the modules so that the series connected modules provide AC power that can be fed to a power grid.

44. A power conversion system in accordance with claim 41, such that when commanded, a mains relay is opened and each module is commanded to bypass such that the series connection is electrically shut down making it safe for maintenance work to be performed.

45. A method of converting power comprising: providing a plurality of modules each having an input, an output and a storage device and being connected in, series, each module being connected to at least one power source capable of storing energy that supplies power to the storage device of the module; and controlling the voltage applied by the storage device across the input and output of each of the modules from a central control unit such that said voltage is varied between a maximum module voltage and a minimum module voltage such that the total voltage across the series connected modules forms an AC signal or rectified version of an AC signal; detecting charge levels in the power sources and controlling charge levels in the power sources and the step of controlling charge levels in the power sources by switching the modules into series in one direction to reduce excess charge and in an opposite direction to increase deficient charge levels.

* * * * *